US007475850B2

(12) United States Patent
Vetillard et al.

(10) Patent No.: US 7,475,850 B2
(45) Date of Patent: Jan. 13, 2009

(54) COCKPIT FLOOR FOR AIRCRAFT

(75) Inventors: Alban Vetillard, Fonsegrives (FR); Emmanuel Parro, Toulouse (FR)

(73) Assignee: Airbus France, Toulouse (FR)

( * ) Notice: Subject to any disclaimer, the term of this patent is extended or adjusted under 35 U.S.C. 154(b) by 92 days.

(21) Appl. No.: 11/143,683

(22) Filed: Jun. 3, 2005

(65) Prior Publication Data
US 2006/0006283 A1 Jan. 12, 2006

(30) Foreign Application Priority Data
Jul. 8, 2004 (FR) .................................. 04 07629

(51) Int. Cl.
*B64C 1/18* (2006.01)
(52) U.S. Cl. ............................... 244/117 R; 244/118.1; 244/119
(58) Field of Classification Search ............ 244/117 R, 244/119, 118.1, 100 R, 118.2; 52/403.1, 52/289; 114/85
See application file for complete search history.

(56) References Cited

U.S. PATENT DOCUMENTS 3,405,893 A * 10/1968 Rajau et al. ................. 244/119
4,452,657 A * 6/1984 Hamm ....................... 156/198
4,479,621 A 10/1984 Bergholz
5,242,523 A * 9/1993 Willden et al. .............. 156/285
5,843,355 A 12/1998 McCarville et al.
6,068,214 A * 5/2000 Kook et al. .............. 244/118.1
6,427,945 B1 * 8/2002 Bansemir ................. 244/129.1
6,554,225 B1 * 4/2003 Anast et al. ............. 244/117 R
2006/0231681 A1 * 10/2006 Huber et al. ................. 244/119

FOREIGN PATENT DOCUMENTS

FR 2 689 851 10/1993
FR 2 766 407 1/1999

* cited by examiner

*Primary Examiner*—Bret Hayes
*Assistant Examiner*—Benjamin P Lee
(74) *Attorney, Agent, or Firm*—Oblon, Spivak, McClelland, Maier & Neustadt, P.C.

(57) ABSTRACT

The invention relates to an cockpit floor (4) for an aircraft comprising a plurality of spars (14) extending along a longitudinal direction (X) of the aircraft and a plurality of cross-beams (16) assembled to said spars (14) and running along a transverse direction (Y) of the aircraft, the spars (14) and the cross-beams (16) forming a primary structure (12) of the floor (14), the floor also comprising attachment means (64) used to assemble it to the aircraft fuselage. According to the invention, the attachment means comprise a plurality of rods (68) resisting forces applied along the longitudinal (X), each of the rods (68) having an aft end connected to the main structure and a forward end that will be connected to said fuselage, such that each rod is oriented such that its distance from the centre of the floor increases towards the forward end.

22 Claims, 7 Drawing Sheets

COCKPIT FLOOR FOR AIRCRAFT

TECHNICAL FIELD

This invention relates in general to an aircraft cockpit floor comprising particularly a plurality of spars assembled to a plurality of cross-beams.

STATE OF PRIOR ART

The shape of an aircraft cockpit floor is adapted to the narrowing of the fuselage that occurs in this part of the aircraft, in a known manner, in the sense that its width reduces towards the forward part of the aircraft.

Furthermore, this type of floor can extend towards the aft part as far as a cabin part of the aircraft, and more generally forms the floor of the entire nose part of the aircraft.

This type of floor is then designed to satisfy several specific needs, for example such as the need for openings for integration of rudder bars and the cockpit central console, so that aircraft occupants can move about, various equipment such as electrical elements or seats can be installed, to resist mechanical forces that occur in the case of an aircraft crash, or to electromagnetically isolate the lower portion and the upper part of the aircraft.

Cockpit floors including spars and metallic cross-beams are known in prior art, for example made from aluminium or one of its alloys, so as to achieve good mechanical stiffness. Moreover, the global stiffness of such a floor is reinforced by the presence of boxes obtained by the addition of upper and/or lower metallic plates on a part of the assembly composed of spars and cross-beams.

Note that the boxes located at the side ends of the floor are also used as means of attachment of this floor onto the cockpit fuselage frames, and consequently, due to their position between the frames, resist forces applied along the longitudinal direction and passing between a main structure of the floor and the cockpit fuselage frames. For information, these forces applied along the longitudinal direction occur mainly in the case of an aircraft crash, forcing the floor to apply a high pressure in the forward direction in contact with the fuselage frames. This type of force may also be encountered during aircraft pressurisation phases causing a pressure increase in the cockpit. Nevertheless, the magnitude of these forces is much smaller than the magnitude observed during an aircraft crash.

Furthermore, the parts of the assembly not in box form are covered by a honeycomb sandwich type top skin so that in particular aircraft occupants can walk on the floor.

In this type of embodiment according to prior art, a major disadvantage was detected due to the use of boxes to resist forces applied along the longitudinal direction of the aircraft.

The assembly of boxes on the fuselage frames take a long time and is difficult in practise since it may be necessary to successively disassemble and reassemble the bottom and top skins of these boxes.

OBJECT OF THE INVENTION

Therefore, the purpose of the invention is an aircraft cockpit floor that at least partially overcomes the disadvantage mentioned above relative to embodiments according to prior art.

Another purpose of the invention is to present an aircraft in which such a cockpit floor is installed.

To achieve this, the object of the invention is an aircraft cockpit floor comprising a plurality of spars running along a longitudinal direction of the aircraft and a plurality of cross-beams assembled to the spars and running along a transverse direction of the aircraft, the spars and the cross-beams forming a primary floor structure, the floor also comprising attachment means used to assemble it to the aircraft fuselage. According to the invention, the attachment means comprise a plurality of rods resisting forces along the longitudinal direction, these rods each having an aft end connected to the main structure and a forward end that will be connected to the fuselage, such that each rod is oriented such that its distance from the centre of the floor increases towards the forward end.

Therefore for guidance, the forward end of the rods is intended to be connected to the fuselage, and preferably to a longitudinal wall of the fuselage mounted fixed to the fuselage frames.

Advantageously, the floor rods according to the invention designed to resist forces applied along the longitudinal direction can be easily and quickly assembled on the aircraft fuselage, simply by assembling them with their forward end being articulated to this fuselage. The fact that the forward end is assembled fixed to a longitudinal wall of the fuselage fixed to fuselage frames and preferably to an outer skin of this fuselage, makes it possible to distribute the forces very uniformly.

Obviously, the tasks necessary to assemble such rods are much less restrictive than the tasks necessary for successive disassemblies and reassemblies of box lower and upper skins, as used to be done previously.

Furthermore, the rods solution is quite suitable for narrowing of the width of the fuselage like that found in the cockpit part of the aircraft.

Obviously, it should be understood that the rods thus arranged will be stressed in compression in the case of an aircraft crash, and will be stressed in tension during aircraft pressurisation phases causing a pressure increase in the compartment concerned. However, it should be noted that the main role of these rods is to resist forces in the case of an aircraft crash, the function of resisting forces in the longitudinal direction during pressurisation phases being only secondary.

Consequently, such a cockpit floor has the advantage that rods can be included to resist longitudinal forces, such that the length of these rods is significantly less than the length of rods in the direction facing outwards from the centre of the floor and in the aft direction, due to the narrowing observed towards the forward part in this cockpit part of the aircraft. Thus, the reduction in the length of the rods would significantly reduce buckling problems during compression phases of these rods that occur in the case of an aircraft crash.

Preferably, the aft end of each of the rods is connected to one end of one of the spars and/or to one end of one of the cross-beams, through a fitting. Therefore, if the aft end of each rod is connected to the periphery of the main structure, it would be possible for each fitting associated with a rod to be assembled firstly fixed to one end of one of the spars and/or to one end of one of the cross-beams, and secondly articulated on the aft end of the associated rod. In this respect, the solution intended to connect the aft end of each of the rods to one end of one of the spars is preferred to the solution in which this aft end is connected to one end of one of the cross-beams, since the spars are sized to satisfactorily resist forces applied along the longitudinal direction.

Thus, by arranging for the articulation between the fitting and the aft end of the associated rod to be oriented along a vertical direction of the aircraft, and the forward end of this rod to be assembled onto the fuselage through an articulation also oriented along the vertical direction, it is then obvious that each rod is only suitable for resisting forces applied along the longitudinal direction of the aircraft and passing between the longitudinal wall of the fuselage concerned and the main floor structure.

Preferably, each fitting is also assembled fixed to a skin with which it is in contact, this skin covering the main structure of the floor located between the main structure and the fitting.

In other words, the fitting is fixed jointly to the main structure and to the upper skin assembled on top of the main structure, such that the forces passing through the rod can be simultaneously transmitted to these two elements, and then propagate through these elements. It is also clear that connecting the rod to the upper skin enables better distribution of the transmitted forces.

As mentioned above, it could be arranged such that the forward end of each rod would be assembled articulated to the fuselage of the aircraft, and preferably to a longitudinal wall of the fuselage assembled onto the fuselage frames.

Preferably, each rod is located in a plane defined jointly by the longitudinal and transverse directions, and is inclined at an angle of between 0° and 30° from this longitudinal direction. Furthermore, as mentioned above and due to the narrowing of the width of the fuselage found at this level, each rod is then oriented such that its distance from the centre of the floor increases towards the forward end, the magnitude of this outwards direction naturally depending on the value chosen for the angle mentioned above.

It would be possible for the spars and the cross-beams that jointly form the primary floor structure, to be both made from a composite material. This would advantageously result in a significant reduction in the global mass of this floor. For example, the mass reduction compared with conventional solutions according to prior art using metallic materials could be more than 20%.

Furthermore, the cross-beams and spars made from a composite material are advantageously no longer affected by previously encountered risks of corrosion.

Finally, it should be noted that the type of material used in the floor according to the invention is compatible with all specific needs mentioned above, particularly in terms of resisting mechanical forces that occur in the case of an aircraft crash.

Preferably, the spars and cross-beams are made from a composite material based on resin impregnated carbon fibres. This resin used is preferably a thermoplastic resin such as PEEK, PEKK, PPS resin, etc.

Although PEEK resin is preferred due to the high mechanical performances that can be achieved using it, other thermoplastic resin types could be used, such as the so-called PPS resin mentioned above and obtained by polymerisation of phenylene sulphide. Thermosetting resins could also be used.

Another purpose of the invention is an aircraft in which such a floor is installed.

Other advantages and characteristics of the invention will become clear after reading the non-limitative detailed description given below.

BRIEF DESCRIPTION OF THE DRAWINGS

This description will be made with reference to the appended drawings among which.

DETAILED DESCRIPTION OF A PREFERRED EMBODIMENT

Figure 1:
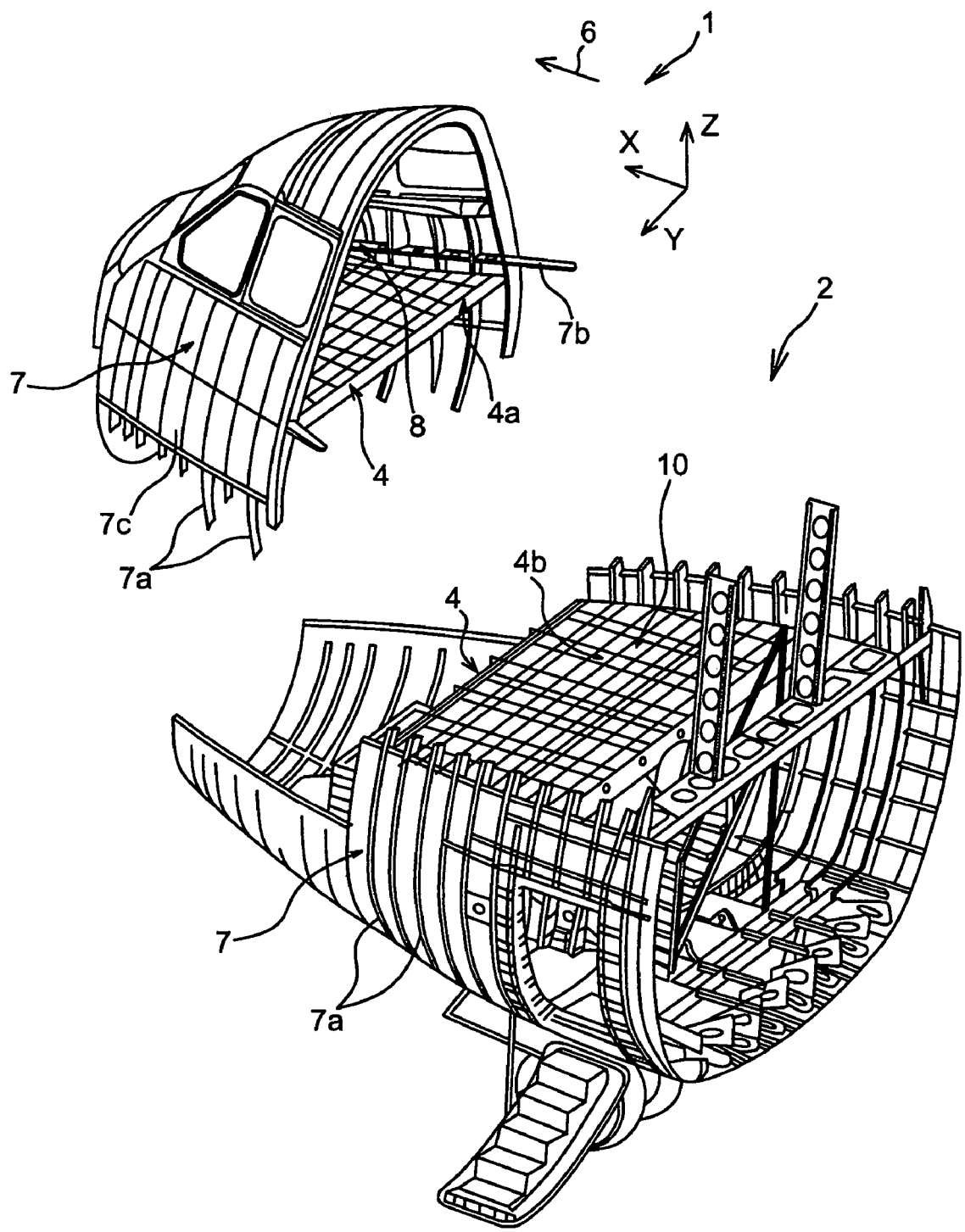
FIG. 1 shows a partially exploded perspective view of the nose part of an aircraft, the aircraft nose comprising a cockpit floor according to a preferred embodiment of this invention.

FIG. 1 shows a partial view of the forward part of an aircraft 1, and more precisely the nose part 2 of this aircraft, comprising a cockpit floor 4 according to a preferred embodiment of this invention.

Throughout the description given below, by convention X denotes the longitudinal direction of the aircraft 1, Y denotes the aircraft transverse direction, and Z denotes the vertical direction, these three directions being orthogonal to each other.

Furthermore, the terms <<forward>> and <<aft>> should be considered with respect to the direction of movement of the aircraft as a result of the thrust applied by the aircraft engines, this direction being shown diagrammatically by the arrow 6.

As can be seen in FIG. 1, the cockpit floor 4 extends in an XY plane over almost the entire length of the nose part 2 of the aircraft, and is installed on a fuselage 7 of the aircraft. As will be explained in detail later, the cockpit floor 4 is firstly installed on part of the longitudinal walls 7b of the fuselage, themselves assembled fixed to the fuselage frames 7a and to an outer fuselage skin 7c, and is secondly fixed to these fuselage frames 7a. For example, the frames 7a are at a spacing from each other along the X direction of the aircraft, and are distributed on each side of the floor 4 in the Y direction.

Furthermore, the shape of the floor 4 narrows in the Y direction towards the forward part, due to the narrowing of the fuselage 7 towards the forward direction.

Furthermore, the nose part 2 may comprise a forward cockpit area 8 and an aft cabin area 10, these two areas 8 and 10 normally being separated by a bulkhead (not shown). More generally, the nose part of an aircraft and the cockpit floor extend over about 10% of the total length of this aircraft along the X direction, namely over a few meters, for example from three to five meters. As an illustrative example, when the aircraft is designed essentially to carry freight and/or military equipment, the aft end of its nose part is delimited by an area that will be used for storage of the elements mentioned above.

As shown, the cockpit floor 4 may possibly be designed as two distinct parts designed to be mechanically assembled, the separation between a forward part 4a and an aft part 4b of the floor being located for example at the bulkhead separating the forward cockpit area 8 from the aft cabin area 10. Nevertheless, to facilitate understanding of the invention, it will be considered in the remaining part of the description that the cockpit floor 4 forms a single element extending practically from one end of the nose part 2 of the aircraft to the other.

Figure 2:
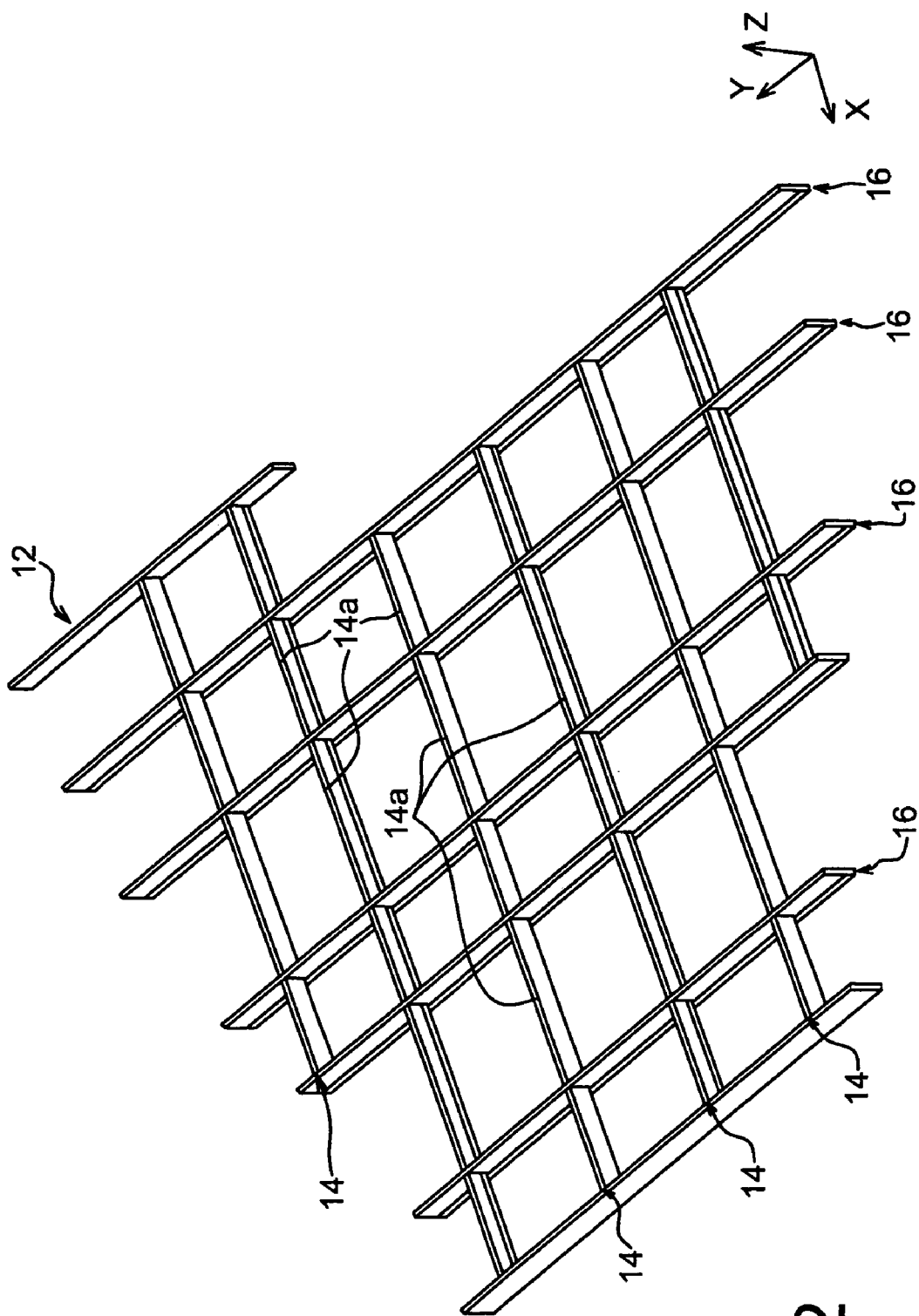
FIG. 2 shows a perspective view of the primary structure of the cockpit floor shown in FIG. 1.

FIG. 2 shows a primary or main structure 12 of the floor 4 shown in FIG. 1, this primary structure 12 being formed from an assembly between a plurality of spars 14 running along the X direction, and a plurality of cross-beams 16 running along the Y direction of the aircraft. It should be noted that this primary structure 12 contributes a significant part of the global stiffness of the cockpit floor 4.

Each spar 14, for example there are six of them, is made from a composite material, and preferably a thermoplastic composite material made using carbon fibre plies impregnated with PEEK, PEKK or PPS resin.

Each spar 14 then preferably has a C-shaped transverse section like a U-section rotated through 90° that is particularly easy to make using a stamping press, that can also easily be used to make a C section in which the top and bottom flanges and the web of the C are approximately the same thickness, for example between 2 and 5 mm.

Similarly, the cross-beams 16, for example there are seven of them, are also each made from a composite material, preferably a thermoplastic composite material made using carbon fibre plies impregnated with PEEK, PEKK or PPS resin.

Each cross-beam 16 then preferably has a C-shaped cross-section similar to a U-section rotated through 90°, in which the top and bottom flanges and the web of the C are approximately the same thickness, for example between 2 and 5 mm.

Preferably, each cross-beam 16 is made from a single piece and extends in the Y direction over the entire width of the primary structure 12. On the other hand, each spar 14 is actually composed of several spar sections 14a and extends in the X direction over the entire length of the primary structure 12.

More precisely, each section 14a of a given spar 14 is positioned between two directly consecutive cross-beams 16 along the X direction, and has two ends rigidly connected to these two corresponding directly consecutive cross-beams 16.

In this respect, it should be noted that the advantage of such a configuration lies in the fact that the top flanges of the spar sections 14a and of the cross-beams 16 are located in the same XY plane, consequently these top flanges of the C jointly form a plane top surface of the primary structure 12.

Figure 3:
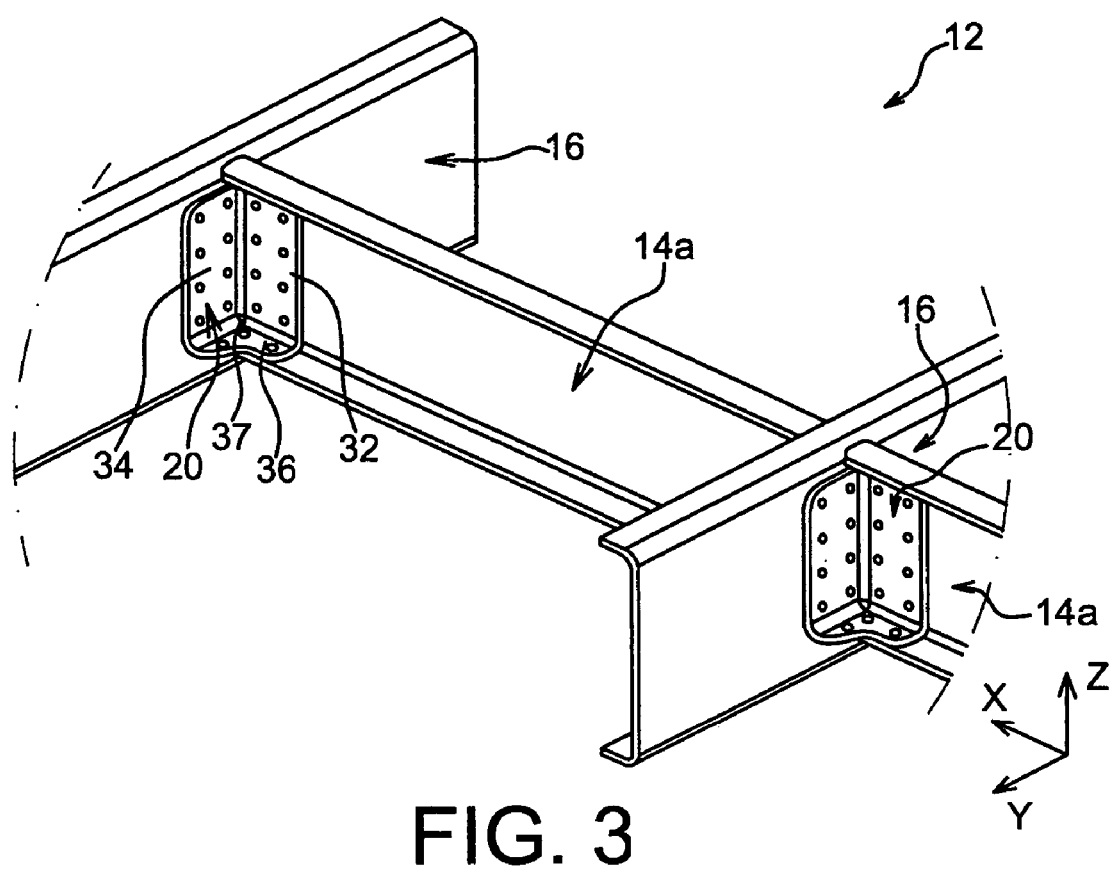
FIG. 3 shows a partial enlarged perspective view of FIG. 2, more particularly showing the assembly between the spar sections and the cross-beams.

FIG. 3 shows that the spar sections 14a are assembled to the cross-beams 16 through junction elements 20 each of which is also made from a composite material, preferably from a thermoplastic composite material made using carbon fibre plies impregnated with PEEK, PEKK or PPS resin.

Globally, each junction element 20 is composed of three plane faces that together form the corner of a cube. In other words, an element 20 comprises a first plane face 32 oriented in an XZ plane, a second plane face 34 oriented in a YZ plane, and a third plane face 36 oriented in an XY plane, each of these three faces having two junction edges (not shown) forming the junction with the other two faces. Furthermore, preferably the three faces 32, 34 and 36 all have the same thickness and all join together in an approximately rounded area 37.

Figure 4:
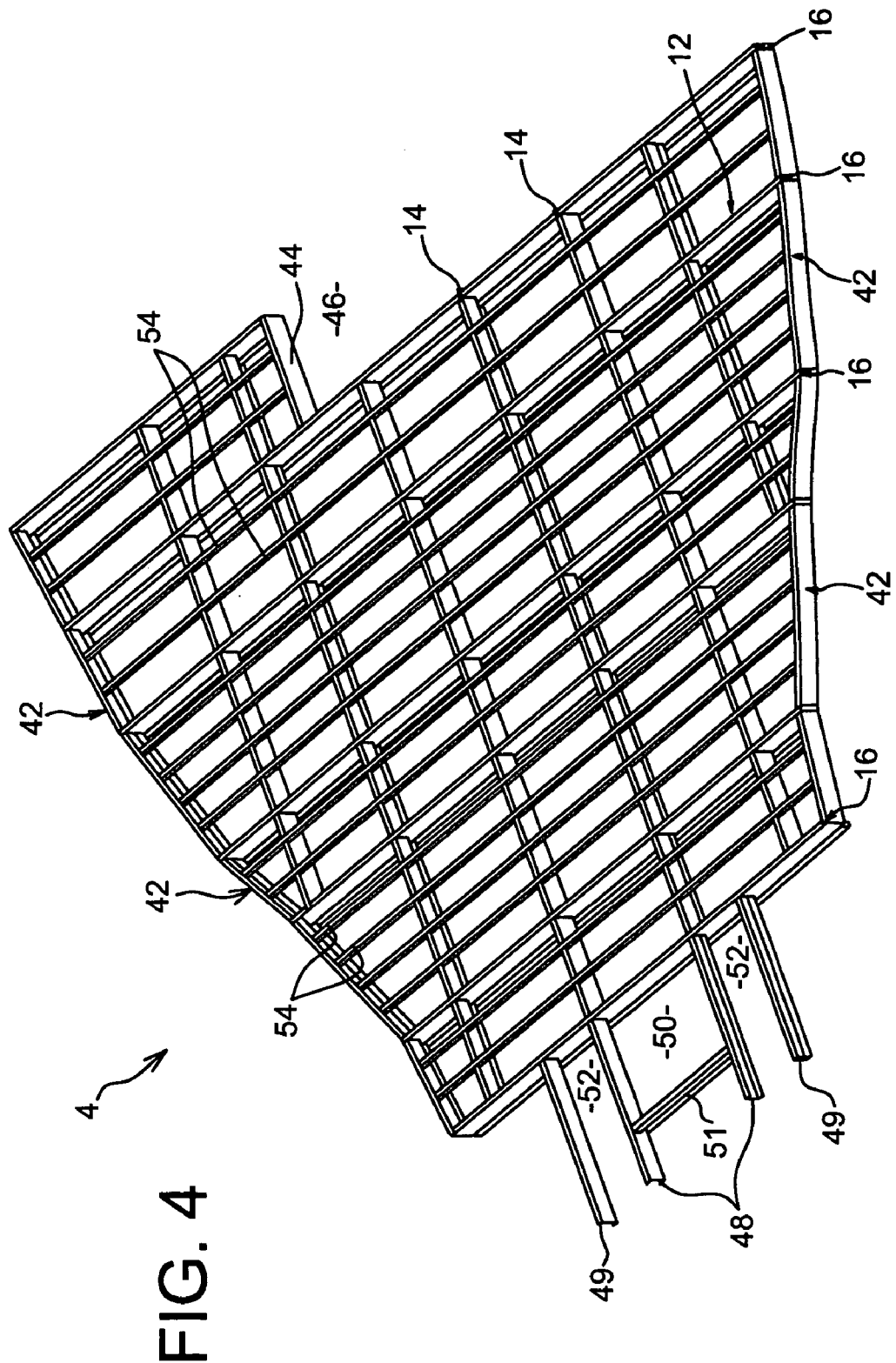
FIG. 4 shows a partial perspective view of the cockpit floor shown in FIG. 1, said floor being shown without its skin.

FIG. 4 shows part of the cockpit floor 4, this floor 4 comprising the primary structure 12 on which peripheral spars 42 were assembled, these spars being identical to or similar to spar sections 14a in the primary structure. As can be seen clearly in FIG. 4, the peripheral spars 42 can be used to connect the ends of cross-beams 16 in the primary structure 12 to each other in pairs.

As an illustrative example, it should be noted that the floor 4 is also provided with a small spar 44 located behind the primary structure 12, and cooperates with an aft cross-beam 16 to define an offset 46 in the structure 12, this offset 46 being adapted to contain a staircase (not shown) for which a top step would be close to the small spar 44.

Furthermore, forward secondary spars 48, 49 (preferably four spars) made from a thermoplastic composite material made using PEEK, PEKK or PPS resin and carbon fibre plies, are fixed to the furthest forward cross-beam 16 of the primary structure 12.

The two secondary spars 48 located closest to the centre jointly delimit a space 50 in which a central cockpit console (not shown) will fit, and can each be located in line with and prolonging a spar 14 of the structure 12. They can also be connected to each other at the forward end through a small cross-beam 51 that can also support the central console.

Each of the two secondary side spars 49 also cooperates with one of the two secondary spars 48 to delimit a space 52 into which the rudder bars (not shown) will fit, such that the two spaces 52 obtained are located on each side of the space 50 in the transverse direction Y of the aircraft.

The cockpit floor 4 also comprises stiffener elements 54 that preferably run along the Y direction between the cross-beams 16 of the primary structure 12. For example, the stiffener elements 54 are made from a composite material, preferably a thermoplastic composite material made using PEEK, PEKK or PPS resin and carbon fibre plies, and for example there may be between two and five of them, between two cross-beams 16 directly consecutive to each other in the X direction.

Figure 5:
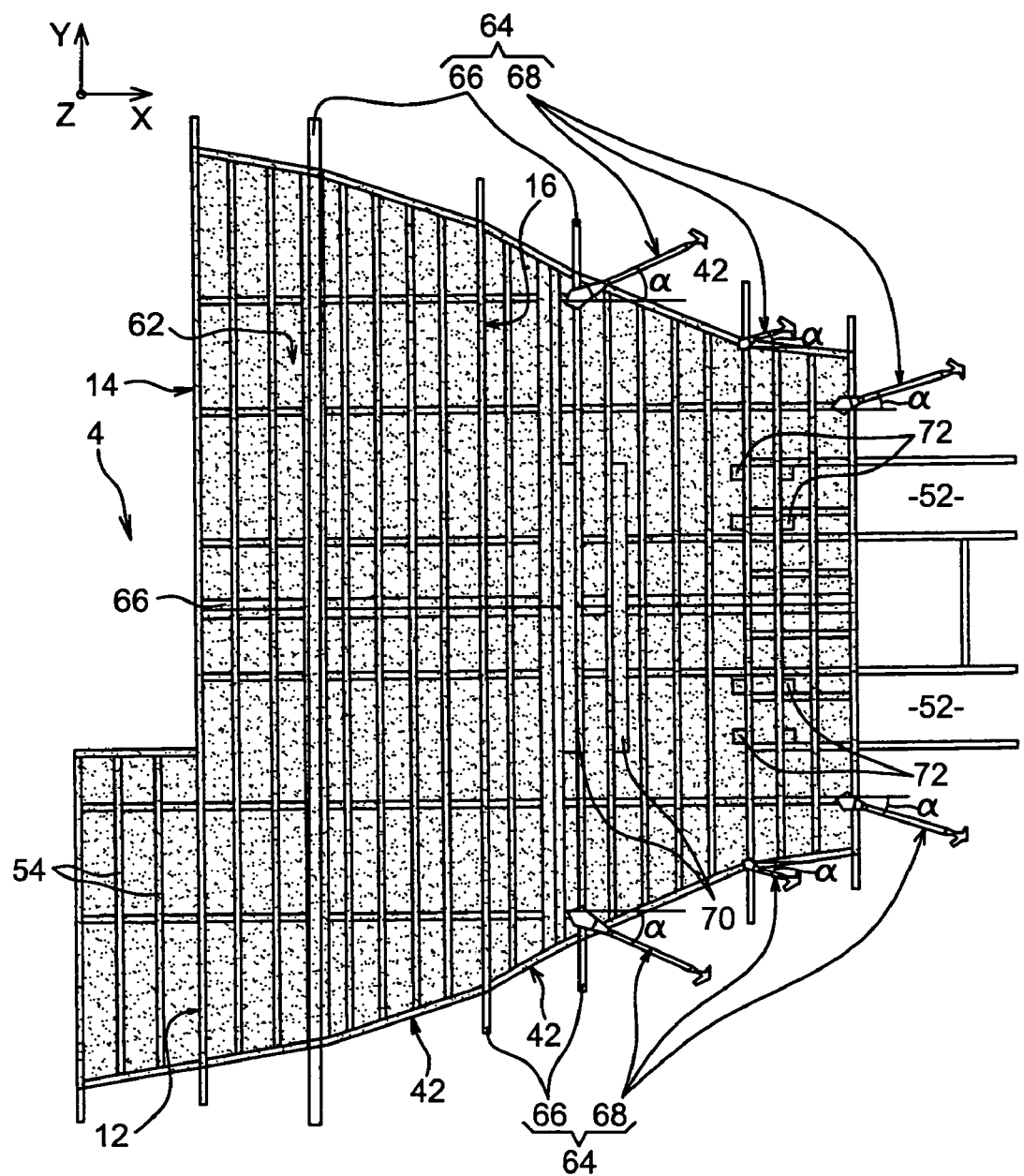
FIG. 5 shows a top view of the cockpit floor shown in FIG. 1, corresponding to the floor shown in FIG. 4 to which a top skin has been assembled with attachment means for assembling it onto the cockpit fuselage frames.

The top parts of the stiffener elements 54 jointly define a top surface that is coincident with the top surface of the primary structure 12, on which a skin 62 will be placed like that shown in FIG. 5.

This skin 62 is rigidly assembled on the spars 14, the cross-beams 16 and on the stiffener elements 54. Note in this respect that these elements 54 are preferably assembled on a lower surface of the skin 62, for example by riveting, before the lower surface of this skin 62 is assembled on the top flanges of the spars 14 and the cross-beams 16.

Once again, the skin 62 is preferably made from a composite material with an approximately constant thickness, and preferably a thermoplastic composite material made using PEEK, PEKK or PPS resin and carbon fibre plies.

In FIG. 5, since the primary structure 12 is not covered by a lower skin, it should be considered that the upper skin 62 only forms half-boxes with the spars 14 and the cross-beams 16.

Also with reference to FIG. 5, it can be seen that the floor 4 is provided with attachment means 64 so that it can be assembled to the fuselage 7, and more particularly to the longitudinal walls 7b, and to the fuselage frames 7a.

Globally, the attachment means 64 are composed of a plurality of articulations 66 that enable rotation about the X direction, and a plurality of rods 68 resisting forces applied along this X direction and passing between the rigid structure 12 and the fuselage 7 (not shown in FIG. 5).

Each of the articulations 66 that will now be briefly described is installed at one end of one of the cross-beams 16, so that it can be fixed to a nearby fuselage frame 7a. More precisely, each cross-beam 16 of the floor 4 supports two articulations 66 arranged at each of its two ends.

Globally, the presence of such an articulation 66 between a cross-beam 16 and an associated fuselage frame 7a has the advantage that it provides a degree of freedom between these two elements, which has the consequence of entirely eliminating the moment about the longitudinal direction X that occurs in embodiments according to prior art, in which such a moment is effectively introduced through the fuselage frames 7a and the cross-beams 16 of the floor 4, mainly during aircraft pressurisation phases.

Thus, these articulations 66 are capable of resisting forces applied along the Y and Z axes and passing between the rigid structure 12 and the cockpit fuselage frames 7a.

Forces applied along the X direction and passing between the rigid structure 12 and the cockpit fuselage 7 are resisted by the rods 68 that will be described below.

FIGS. 5 et 6 show that the attachment means 64 comprise six rods 68 distributed symmetrically about an XZ plane passing through the middle of the floor 4, and therefore passing through a longitudinal main centre line of the aircraft (not shown).

Obviously, the number of force resisting rods 68 may be adapted as a function of needs encountered, without going outside the scope of the invention.

In this preferred embodiment in which each of the two sides of the floor 4 is provided with three rods 68, it should be noted that each of these rods 68 is associated with a fitting 70 that is assembled fixed onto the upper skin 62, and onto one end of one of the spars 14 and/or onto one end of one of the cross-beams 16, the solution of assembling onto one end of one of the spars 14 being preferred.

More precisely, each fitting 70 is arranged on the upper skin 62 to which it is fixed using conventional rivet type assembly means, these assembly means passing successively (from top to bottom) through the fitting 70, the skin 62 and at least a part of one end of one of the spars 14 and/or part of one end of one of the cross-beams 16.

Each fitting 70, which is therefore fixed to a peripheral part of the rigid structure 12, and is extended so that it projects from this structure at least partially in the X direction and/or the Y direction, such that this projecting part of the fitting 70 can easily be assembled to an aft end of the associated rod 68.

Assembly is made using an articulation 72 arranged between the fitting 70 and the aft end of the associated rod 68, this articulation 72 being arranged along the Z direction of the aircraft, and in particular being used to compensate construction clearances.

Similarly, the forward end of each rod 68 will be assembled to the longitudinal wall 7b fixed onto the fuselage frames 7a and onto the outer skin of the fuselage 7c (not shown in FIG. 6), through an articulation 74 oriented along the Z direction, such that these rods 68 are only capable of resisting forces along the X direction and passing between the longitudinal walls 7b and the main structure 12.

Figure 7:
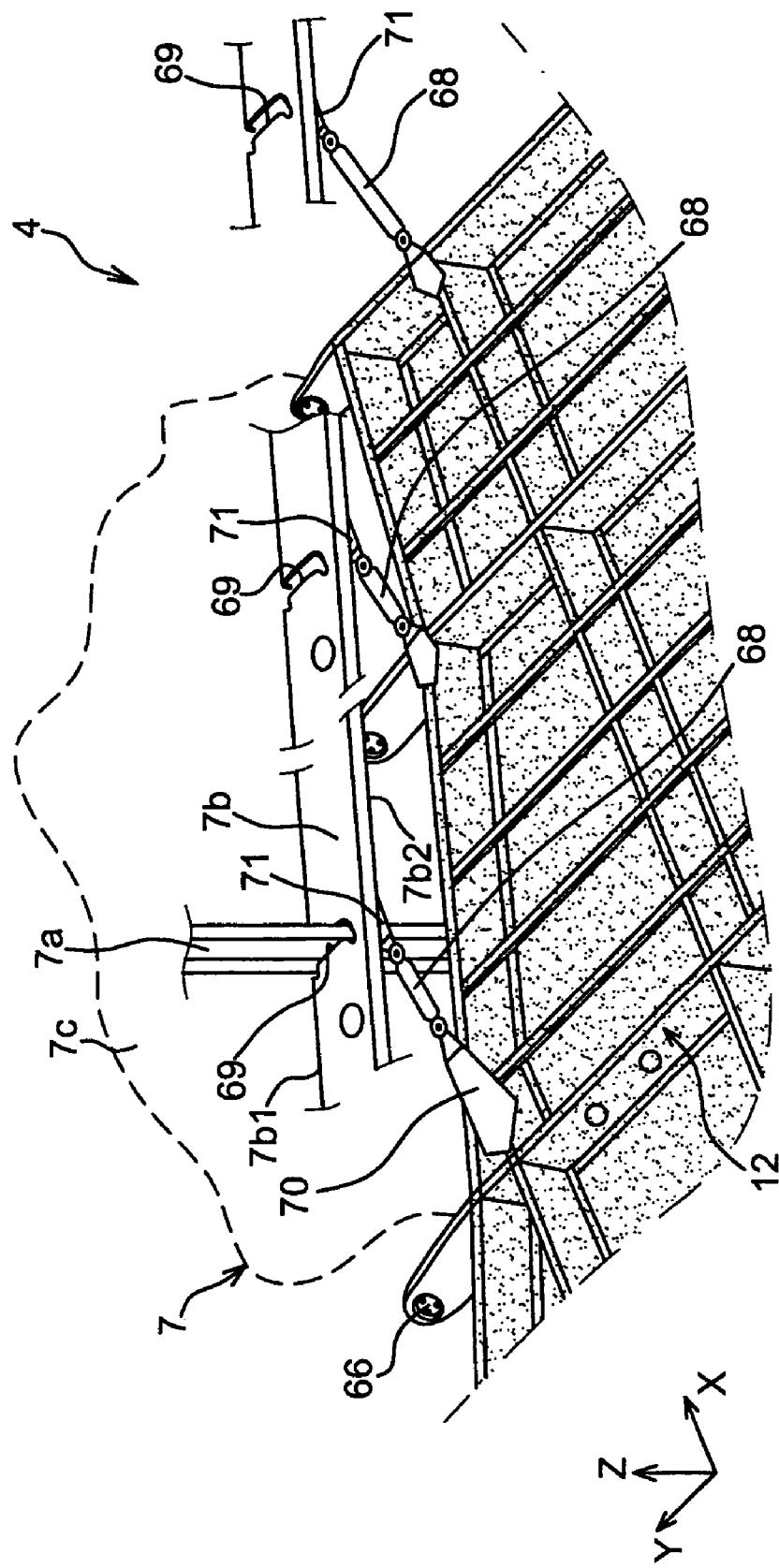
FIG. 7 shows a partial enlarged view of FIG. 6, to which part of the aircraft fuselage has been added.

We will now describe the arrangement between the different elements of the fuselage 7 and the rods 68 of the floor 4 in more detail, with reference more specifically to FIG. 7.

FIG. 7 only shows the forward left side of the cockpit, but obviously the right side is identical. Consequently, the right side is not described any further.

Firstly, as shown also in FIG. 1, it can be seen that the fuselage 7 comprises the outer skin 7c fixed onto the fuselage frames 7a each of which extends along a YZ plane. The fuselage 7 also comprises the longitudinal wall 7b that is globally located in an XY plane, preferably the same as the plane containing the upper skin 62 covering the main structure 12 of the floor 4.

The longitudinal wall 7b shown truncated in FIG. 7 can be made in several segments, for example two segments, and is assembled fixed on the frames 7a and on the outer skin 7c, preferably using angles (not shown). In this case, it would be possible to arrange the longitudinal wall 7b to extend approximately parallel to the curvature of the outer skin 7c of the fuselage 7 considered in an XY plane, on each side of the cockpit, over a length of about 2.50 m, using two segments about 1.25 m each.

The wall 7b is provided with indentations 69 through which fuselage frames 7a can pass, to obtain contact and attachment between an outer edge 7b1 of the longitudinal wall 7b and the inner face of the outer skin 7c. Thus, each of these indentations 69 is in the form of a notch open on the side of the outer edge 7b1 and globally extends along the Y direction, and with a shape approximately the same as a section of the frame 7a that will penetrate into it.

As can be seen on this FIG. 7, the forward end of each rod 68 is connected using a fitting 71 to an inner edge of the longitudinal wall 7b. Moreover, it should be noted also that to achieve good distribution of forces, each rod 68 is positioned such that its virtual prolongation, in other words its virtual line of sight, intercepts a junction area between the outer skin 7c and a fuselage frame 7a located in front of the rod concerned.

Figure 6:
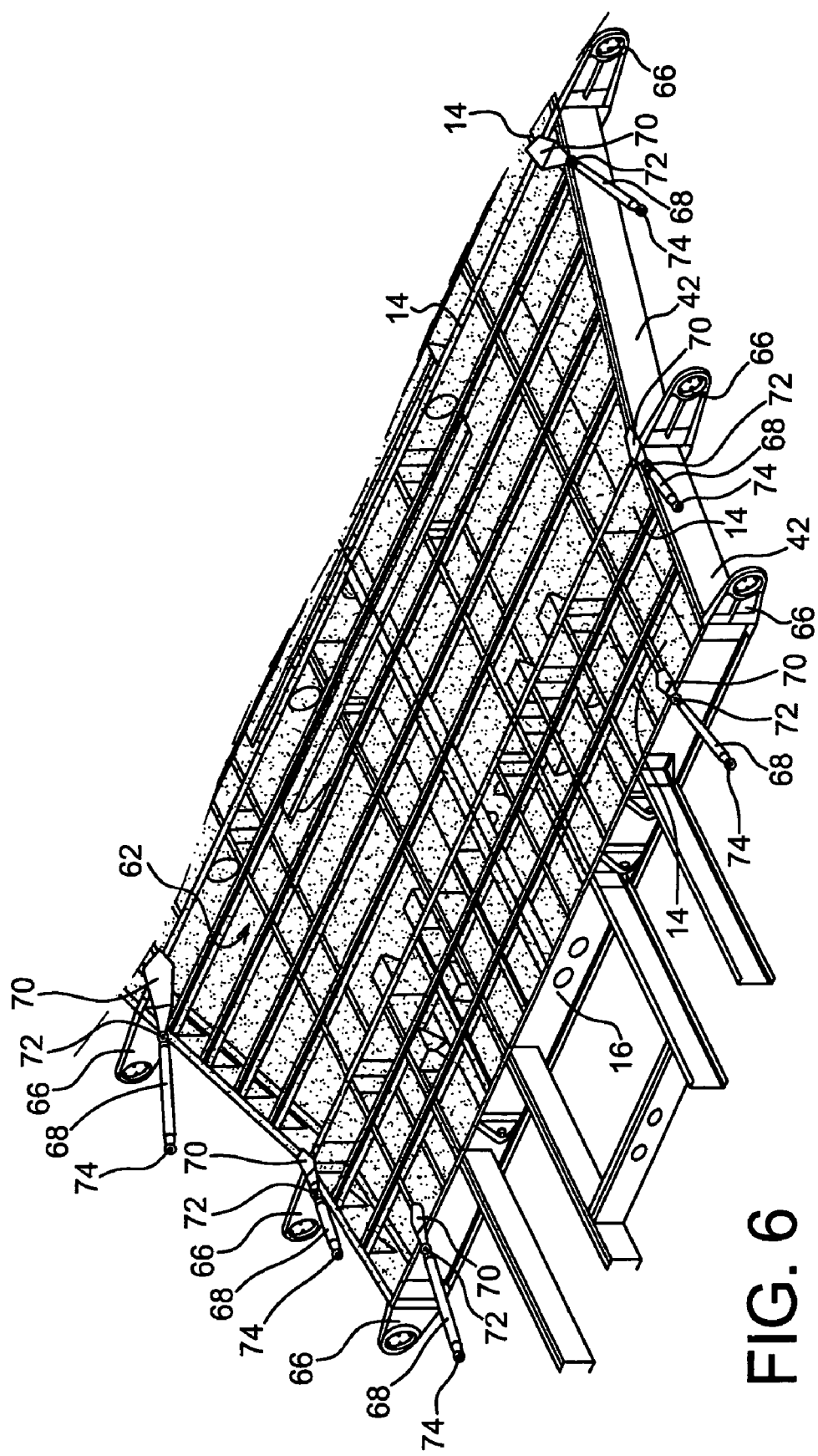
FIG. 6 shows a perspective view more specifically showing the attachment means shown in FIG. 5.

We will now describe the positions of three fittings 70 associated with the three force resisting rods 68 on one of the two sides of the floor 4, in more detail with reference to FIG. 6.

Firstly, the fitting 70 associated with the furthest forward force resisting rod 68 is fixed above the skin 62 at a location at which it can also be fixed to a forward end of the second outermost spar 14, and also to the furthest forward cross-beam 16.

The intermediate rod 68 is associated with a fitting 70 fixed above the skin 62 at a location such that it can also be fixed to one end of the second furthest forward cross-beam 16, and possibly to one and/or the other of the two peripheral spars 42 connected to the end of the cross-beam that has just been mentioned. For example, the end of this cross-beam 16 is also provided with an articulation 66 oriented along the X direction and belonging to the fastening means 64 of the floor 4, this articulation 66 projecting from the end of the associated cross-beam in the Y direction, like each of the other articulations 66.

Finally, the rod 68 closest to the aft end is fixed above the skin 62 at a location that enables it to be also fixed to a forward end of the outermost spar 14, and to an approximately central cross-beam 16, and possibly to the peripheral spar 42 located at this position.

Naturally, as mentioned above, the assembly of the different fittings 70 with the elements that have just been mentioned above is preferably done using a plurality of rivets oriented along the Z direction, each passing through the associated fitting 70 and through at least one other of the elements concerned.

In FIG. 5, it can also be seen that each rod 68 is oriented such that its distance from the centre of the floor 4 increases towards the forward end, unlike the peripheral spars 42 for which the distance from the centre of the floor 4 increases towards the aft end.

More precisely, each of the six rods 68, each of which is preferably arranged in the same XY plane slightly above the plane of the upper surface of the skin 62, is inclined at an angle $\alpha$ from the X direction which is between 0° and 30° C. Preferably, the value of the angle $\alpha$ is chosen to be as close as possible to 0°, and can be different for each rod 68. Furthermore, each of these rods 68 is fixed to a longitudinal fuselage wall 7b, as described with reference to FIG. 7.

It is also desirable not to choose excessively long rods so as to avoid buckling problems in compression, or excessively short rods which would make assembly adjustments difficult.

Obviously, those skilled in the art could make various modifications to the cockpit floor 4 that has just been described solely as a non-limitative example.

The invention claimed is:

1. An aircraft cockpit floor comprising:
a plurality of spars extending substantially parallel to a longitudinal direction (X) of the aircraft;
a plurality of cross-beams assembled to said spars and extending substantially parallel to a transverse direction (Y) of the aircraft, the spars and the cross-beams forming a primary structure of said aircraft cockpit floor;
a plurality of articulations configured to assemble said aircraft cockpit floor to the aircraft fuselage; and
a plurality of rods configured to assemble said aircraft cockpit floor to the aircraft fuselage,
wherein said plurality of rods are configured to resist forces applied substantially parallel to the longitudinal direction (X), each of said rods having an aft end connected to the primary structure and a forward end connected to said fuselage, such that each rod is oriented such that its distance from the centre of the floor increases towards the forward end of the aircraft, and
wherein each of said rods is oriented such that the aft end of a respective one of said rods is closer to the aft end of the aircraft than the forward end of the respective one of said rods
wherein said plurality of articulations are configured to allow rotation about an axis substantially parallel to the longitudinal direction (X).

2. An aircraft cockpit floor according to claim 1, wherein the forward end is connected to a longitudinal fuselage wall fixed directly onto fuselage frames of the fuselage.

3. An aircraft cockpit floor according to claim 1, wherein the aft end of each of the rods is connected to one end of one of said spars or to one end of one of said cross-beams, through a fitting.

4. An aircraft cockpit floor according to claim 3, wherein each fitting associated with a rod is fixed to one end of one of said spars or to one end of one of the cross-beams, and articulated on the aft end of the associated rod.

5. An aircraft cockpit floor according to claim 4, wherein an articulation between the fitting and the aft end of the associated rod is oriented such that the fitting and the aft end of the associated rod can pivot relative to each other about an axis substantially parallel to a vertical direction (Z) of the aircraft.

6. An aircraft cockpit floor according to claim 4, wherein each fitting is fixed to a skin with which each fitting is in contact, said skin covering the main structure of the aircraft cockpit floor, located between the main structure and the fitting.

7. An aircraft cockpit floor according to claim 1, wherein the forward end of each of said rods is configured to be articulately assembled on the fuselage.

8. An aircraft cockpit floor according to claim 1,
wherein each rod is located in a plane defined jointly by the longitudinal (X) and transverse (Y) directions, and
wherein each rod is inclined at an angle of between 0° and 30° from said longitudinal direction (X).

9. An aircraft cockpit floor according to claim 1, wherein said spars and said cross-beams are made from a composite material.

10. An aircraft cockpit floor according to claim 9, wherein said spars and said cross-beams are made from a thermoplastic composite material.

11. An aircraft cockpit floor according to claim 10, wherein the thermoplastic composite material is made using plies of carbon fibres impregnated with PEEK, PEKK or PPS resin.

12. An aircraft, comprising the aircraft cockpit floor according to claim 1.

13. An aircraft cockpit floor according to claim 1, further comprising a plurality of stiffener elements that extend substantially parallel to the transverse direction (Y) of the aircraft, the plurality of stiffener elements located between the cross-beams of said primary structure.

14. An aircraft cockpit floor according to claim 13, wherein a skin is rigidly assembled on the spars, the cross-beams, and the plurality of stiffener elements.

15. An aircraft cockpit floor according to claim 1, wherein each of the plurality of rods is positioned such that its virtual prolongation intercepts a junction area between an outer skin of an aircraft in which the aircraft cockpit floor is installed and a fuselage frame located at the forward end of each of the plurality of rods.

16. An aircraft cockpit floor according to claim 1, further comprising an aft part and a forward part,
wherein shape of said aircraft cockpit floor narrows in the transverse direction (Y) towards the forward part of the aircraft cockpit floor.

17. An aircraft cockpit floor according to claim 16, wherein each rod is oriented such that a perpendicular distance from a line substantially parallel to the longitudinal direction (X) increases towards the forward part of the aircraft cockpit floor.

18. An aircraft cockpit floor comprising:
a plurality of spars extending substantially parallel to a longitudinal direction (X) of the aircraft;
a plurality of cross-beams assembled to said spars and extending substantially parallel to a transverse direction (Y) of the aircraft, the spars and the cross-beams forming a primary structure of said aircraft cockpit floor; and
a plurality of rods configured to assemble said aircraft cockpit floor to the aircraft fuselage,
wherein said plurality of rods are configured to resist forces applied substantially parallel to the longitudinal direction (X), each of said rods having an aft end connected to the primary structure and a forward end connected to said fuselage, such that each rod is oriented such that its distance from the centre of the floor increases towards the forward end of the aircraft, and
wherein each of said rods is oriented such that the aft end of a respective one of said rods is closer to the aft end of the aircraft than the forward end of the respective one of said rods,
further comprising a plurality of articulations configured to assemble said aircraft cockpit floor to the aircraft fuselage,
wherein said plurality of articulations are configured to resist forces applied substantially parallel to the transverse direction (Y) and a vertical axis (Z),
wherein said plurality of articulations are configured to allow rotation about an axis substantially parallel to the longitudinal direction (X), and
wherein each respective articulation is installed at an end of a respective one of the plurality of cross-beams.

19. An aircraft cockpit floor according to claim 18, wherein each of the plurality of articulations are is fixed to a fuselage frame of the fuselage, and
wherein each of the plurality of articulations is configured to provide a degree of freedom between one of the plurality of cross-beams to which it is attached and said fuselage frame.

20. An aircraft cockpit floor according to claim 18, wherein the plurality of articulations are configured to allow rotation around an axis substantially parallel to the longitudinal direction (X) of the aircraft.

21. An aircraft cockpit floor comprising:
a plurality of spars extending substantially parallel to a longitudinal direction (X) of the aircraft;
a plurality of cross-beams assembled to said spars and extending substantially parallel to a transverse direction (Y) of the aircraft, the spars and the cross-beams forming a primary structure of said aircraft cockpit floor; and
a plurality of rods configured to assemble said aircraft cockpit floor to the aircraft fuselage,
wherein said plurality of rods are configured to resist forces applied substantially parallel to the longitudinal direction (X), each of said rods having an aft end connected to the primary structure and a forward end connected to said fuselage, such that each rod is oriented such that its distance from the centre of the floor increases towards the forward end of the aircraft, and
wherein each of said rods is oriented such that the aft end of a respective one of said rods is closer to the aft end of the aircraft than the forward end of the respective one of said rods,
further comprising a plurality of articulations configured to assemble said aircraft cockpit floor to the aircraft fuselage,
wherein said plurality of articulations are configured to resist forces applied substantially parallel to the transverse direction (Y) and a vertical axis (Z), and
wherein said plurality of articulations are configured to allow rotation about an axis substantially parallel to the longitudinal direction (X).

22. An aircraft cockpit floor comprising:
a plurality of spars extending substantially parallel to a longitudinal direction (X) of the aircraft;
a plurality of cross-beams assembled to said spars and extending substantially parallel to a transverse direction (Y) of the aircraft, the spars and the cross-beams forming a primary structure of said aircraft cockpit floor; and
a plurality of rods configured to assemble said aircraft cockpit floor to the aircraft fuselage,
wherein said plurality of rods are configured to resist forces applied substantially parallel to the longitudinal direction (X), each of said rods having an aft end connected to the primary structure and a forward end connected to said fuselage, such that each rod is oriented such that its distance from the centre of the floor increases towards the forward end of the aircraft, and
wherein each of said rods is oriented such that the aft end of a respective one of said rods is closer to the aft end of the aircraft than the forward end of the respective one of said rods,
further comprising a plurality of articulations configured to assemble said aircraft cockpit floor to the aircraft fuselage,
wherein said plurality of articulations are configured to allow rotation about an axis substantially parallel to the longitudinal direction (X), and
wherein each respective articulation is installed at an end of a respective one of the plurality of cross-beams.

\* \* \* \* \*